United States Patent
Krull et al.

[11] Patent Number: 5,705,603
[45] Date of Patent: Jan. 6, 1998

[54] POLYETHERAMINES WITH POLYMERS OF α, β-UNSATURATED DICARBOXYLIC ACIDS

[75] Inventors: Matthias Krull, Oberhausen; Michael Feustel, Köngernheim; Erdmann Mielcke, Bad Soden, all of Germany

[73] Assignee: Hoechst Aktiengesellschaft, Frankfurt, Germany

[21] Appl. No.: 493,623

[22] Filed: Jun. 22, 1995

[30] Foreign Application Priority Data

Jun. 24, 1994 [DE] Germany ............... 44 22 159.2

[51] Int. Cl.$^6$ ............... C08G 69/26; C08G 63/48
[52] U.S. Cl. ............... 528/332; 528/288; 528/289; 528/292; 528/296; 528/302; 528/306; 528/332; 528/336; 528/338; 525/10; 525/11; 252/51.5 A; 44/331
[58] Field of Search ............... 528/288, 289, 528/292, 296, 298, 302, 306, 332, 336, 338; 525/10, 11; 252/51.5 A; 44/331

[56] References Cited

U.S. PATENT DOCUMENTS

| | | | |
|---|---|---|---|
| 3,216,941 | 11/1965 | de Vries | 252/51.5 A |
| 3,317,291 | 5/1967 | Marsh et al. | 149/4 |
| 3,520,852 | 7/1970 | Pratt et al. | 525/380 |
| 4,900,332 | 2/1990 | Denis et al. | 44/62 |
| 5,034,018 | 7/1991 | Gutierrez et al. | 44/331 |
| 5,064,921 | 11/1991 | Blum et al. | 526/262 |
| 5,229,020 | 7/1993 | Gutierrez et al. | 252/51.5 |
| 5,238,466 | 8/1993 | Gutierrez et al. | 44/331 |
| 5,391,632 | 2/1995 | Krull et al. | 525/327.6 |
| 5,439,972 | 8/1995 | Charles et al. | 525/54.1 |

FOREIGN PATENT DOCUMENTS

| | | |
|---|---|---|
| 641724 | 4/1964 | Belgium . |
| 0 324 547 | 7/1989 | European Pat. Off. . |
| 0 401 627 | 12/1990 | European Pat. Off. . |
| 0 561 722 | 9/1993 | European Pat. Off. . |
| 0 606 055 | 7/1994 | European Pat. Off. . |
| 0 634 424 | 1/1995 | European Pat. Off. . |
| 1 313 191 | 4/1963 | France . |
| 2 592 387 | 7/1987 | France . |
| 2 613 371 | 10/1988 | France . |
| 93/08243 | 4/1993 | WIPO . |

*Primary Examiner*—Samuel A. Acquah
*Attorney, Agent, or Firm*—Connolly & Hutz

[57] ABSTRACT

The invention relates to reaction products of polyetheramines with polymers containing dicarboxylic anhydride groups, which contain 20–80, preferably 40–60, mol % of bivalent structural units A and/or C and, if required, B

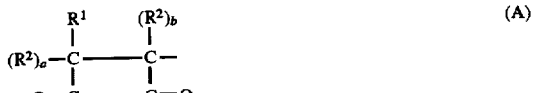

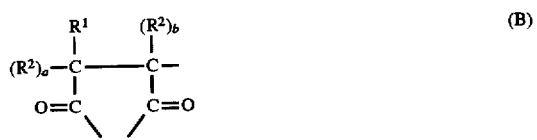

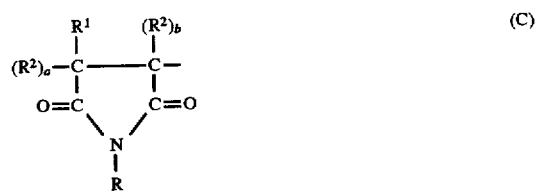

in which
$R^1$ and $R^2$, independently of one another, are hydrogen or methyl,
a and b are equal to zero or one and a+b is equal to one,
Y is X or $NRR^3$,
X is —OH, —O—$C_{1-30}$-alkyl, $NR^3R^4$ or —O$^\ominus$N$^\oplus$R$^3$R$^4$,
$R^3$ and $R^4$, independently of one another, are hydrogen, $C_6$–$C_{40}$-alkyl or R,
R is

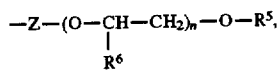

with the proviso that at least 1 mol % of the anhydride groups bonded to the polymer have reacted with a polyetheramine,
Z is $C_2$–$C_4$-alkyl,
n is a number from 1 to 1000,
$R^5$ is hydrogen, $C_1$–$C_{30}$-alkyl, $C_5$–$C_{12}$-cycloalkyl or $C_6$–$C_{30}$-aryl and
$R^6$ is hydrogen or $C_1$–$C_4$-alkyl, preferably methyl, and 80–20 mol %, preferably 60–40 mol % of bivalent structural units D

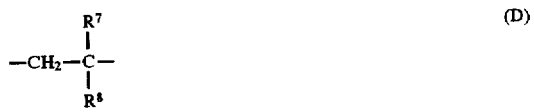

in which
$R^7$ is hydrogen or $C_1$–$C_4$-alkyl and
$R^8$ is $C_1$–$C_{60}$-alkyl or $C_6$–$C_{18}$-aryl.

6 Claims, No Drawings

POLYETHERAMINES WITH POLYMERS OF α, β-UNSATURATED DICARBOXYLIC ACIDS

DESCRIPTION

Reaction products of polyetheramines with polymers of α,β-unsaturated dicarboxylic acids Mineral oils and mineral oil distillates, such as diesel fuel or heating oil, contain as a rule a proportion of dissolved n-paraffins which crystallize out when the temperature decreases and may thus lead to a deterioration in the flow properties of these oils or distillates. In the case of mineral oils, this may lead to deposits on the wall during transport through pipelines and in particular cases (for example on shutdown of a pipeline) even to complete blockage. Furthermore, precipitates of paraffins may lead to complications in the storage and further processing of the mineral oils. In the case of mineral oil distillates, blockages of the filters in diesel engines and furnaces may occur as a result of the crystallization.

In addition to the traditional methods for overcoming these paraffin problems (thermally, mechanically or by means of solvents), which are based merely on removal of the precipitates already formed, recent years have seen the development of a number of chemical additives (cold flow improvers, paraffin inhibitors) which interact physically with the precipitated paraffin crystals and thus modify their shape, size and adhesion properties. The additives act as additional crystal nuclei and partially crystallize out with the paraffins, resulting in a larger number of small paraffin crystals of modified crystal shape. Oils into which additives have been introduced can still be pumped and processed at temperatures which are frequently more than 20° C. lower than in the case of oils which have not been treated with additives.

A further effect of the cold flow improvers is explained by dispersing of the crystals. Thus, paraffin dispersants prevent sedimentation of the crystals and hence the formation of a paraffin-rich layer on the bottom of the storage container.

The unpublished European Patent Application No. 94100009.3 relates to terpolymers based on α,β-unsaturated dicarboxylic anhydrides, α,β-unsaturated compounds and polyoxyalkylene ethers of lower, unsaturated alcohols and to their use as paraffin inhibitors for paraffin-containing mineral oil products.

EP-A-0 154 177 describes reaction products of copolymers based on maleic anhydride and α,β-unsaturated compounds with primary monoalkylamines and/or aliphatic alcohols. These copolymers are suitable in particular as paraffin inhibitors for paraffin-containing mineral oil products, for example crude oils and distillation residues from mineral oil processing.

EP-A-0 436 151 discloses reaction products of copolymers based on maleic anhydride and α,β-unsaturated compounds with dialkylamines. These copolymers are added to mineral oil middle distillates in amounts of from 50 to 1000 ppm. Such mineral oil middle distillates already contain, as a rule, flow improvers, such as ethylene/vinyl ester copolymers.

EP-A-0 283 293 discloses copolymers derived from the polymerization of an aliphatic olefin with maleic anhydride, where the copolymer must have both an ester group and an amido group, each of which contains an alkyl group having at least 10 carbon atoms, and copolymers from the reaction of a secondary amine with a polymer which contains anhydride groups, equal amounts of amides and amine salts being prepared from the anhydride groups.

EP-A-0 523 672 relates to copolymers of ethylenically unsaturated carboxylic esters with polyoxyalkylene ethers of lower, unsaturated alcohols and their use in paraffin-containing oils, such as crude oils, residue oils and oil distillates.

EP-A-0 405 893 discloses a lubricant containing an ethylene/olefin copolymer grafted with maleic anhydride and reacted with alkyleneamine or oxyalkyleneamine having at least two primary amino groups and an alkenylsuccinic anhydride.

U.S. Pat. No. 4,632,769 relates to an ethylene/olefin copolymer grafted with maleic anhydride and reacted with alkyleneamine or oxyalkyleneamine having at least two amino groups and its use as a viscosity index improver in lubricating oils and as an additive in fuel oils.

WO 8700857 and WO 8700856 disclose reaction products of alkenylsuccinic anhydrides with polyetheramines as thickeners which are stable to shearing and intended for water-based lubricants and hydraulic fluids.

EP-A-310 875 describes the use of polyetheramines as fuel additives for gasoline engines for cleaning valves and carburettors.

However, the paraffin-inhibiting and paraffin-dispersing effect of the known cold flow improvers is insufficient, particularly in middle distillates, so that in some cases large paraffin crystals may form on cooling and, owing to their higher density, may settle out in the course of time and lead to a paraffin-rich layer on the bottom and a low-paraffin upper layer.

It has now been found that the paraffin crystals precipitated on cooling remain dispersed as a result of the addition of reaction products of polyetheramines with polymers containing dicarboxylic anhydride groups to mineral oil distillates to which flow improvers based on ethylene/vinyl ester copolymers have been added.

This uniform dispersing results in a homogeneously cloudy phase in which the CFPPs (Cold Filter Plugging Points) of the upper and lower phase are approximately equal, said CFPPs being decisive for the operability.

The invention relates to reaction products of polyetheramines with polymers containing dicarboxylic anhydride groups, which contain 20–80, preferably 40–60, mol % of bivalent structural units A and/or C and, if required, B

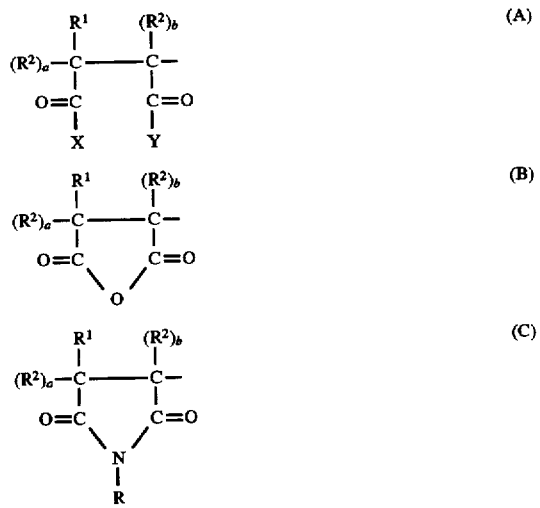

in which
R$^1$ and R$^2$, independently of one another, are hydrogen or methyl, a and b are equal to zero or one and a+b is equal to one,
Y is X or $NRR^3$,
X is —OH, —O—$C_{1-30}$-alkyl, $NR^3R^4$ or —$O^\ominus N^\oplus R^3R^4$,
$R^3$ and $R^4$, independently of one another, are hydrogen, $C_6$–$C_{40}$-alkyl or R,
R is

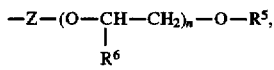

with the proviso that at least 1 mol % of the anhydride groups bonded to the polymer has been reacted with a polyetheramine,
Z is $C_2$–$C_4$-alkyl,
n is a number from 1 to 1000,
$R^5$ is hydrogen, $C_1$–$C_{30}$-alkyl, $C_5$–$C_{12}$-cycloalkyl or $C_6$–$C_{30}$-aryl and
$R^6$ is hydrogen or $C_1$–$C_4$-alkyl, preferably methyl, and 80–20 mol %, preferably 60–40 mol % of bivalent structural units D

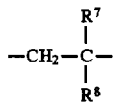

in which
$R^7$ is hydrogen or $C_1$–$C_4$-alkyl and
$R^8$ is $C_1$–$C_{60}$-alkyl or $C_6$–$C_{18}$-aryl.

The abovementioned alkyl, cycloalkyl and aryl radicals may be unsubstituted or substituted. Suitable substituents are, for example, ($C_1$–$C_6$)-alkyl, halogens, such as fluorine, chlorine, bromine and iodine, preferably chlorine, and ($C_1$–$C_6$)-alkoxy.

According to the invention, alkyl is in general a straight-chain or branched hydrocarbon radical having 1–30, preferably 10–24, carbon atoms. The following may be mentioned individually: n-butyl, tert-butyl, n-hexyl, n-octyl, decyl, dodecyl, tetradecyl, hexadecyl, octadecyl, dodecenyl, tetrapropenyl, tetradecenyl, pentapropenyl, hexadecenyl, octadecenyl and eicosanyl or mixtures, such as coconut fatty alkyl, tallow fatty alkyl and behenyl.

According to the invention, cycloalkyl is in general a cyclic aliphatic radical having 5–20 carbon atoms. Preferred cycloalkyl radicals are cyclopentyl and cyclohexyl.

The reaction products according to the invention contain the bivalent structural units A, C and D and, if required, B.

Specifically, the structural units A, B and C are derived from α,β-unsaturated dicarboxylic anhydrides of the general formulae E and/or F

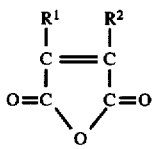

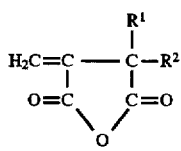

such as maleic anhydride, itaconic anhydride or citraconic anhydride, preferably maleic anhydride.

The structural units D are derived from the α,β-unsaturated olefins of the general formula G.

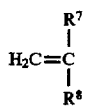

The following α,β-unsaturated olefins may be mentioned by way of example:
styrene, α-methylstyrene, dimethylstyrene, α-ethylstyrene, diethylstyrene, isopropylstyrene, tert-butylstyrene, diisobutylene and α-olefins, such as decene, dodecene, tetradecene, pentadecene, hexadecene, octadecene, $C_{20}$-α-olefin, $C_{24}$-α-olefin, $C_{30}$-α-olefin, tripropenyl, tetrapropenyl, pentapropenyl and mixtures thereof. α-Olefins having 10 to 24 carbon atoms and styrene are preferred, and α-olefins having 12 to 20 carbon atoms are particularly preferred.

The radicals $NRR^3$ (structural unit A) and NR (structural unit C) are derived from polyetheramines of the general formula (H) or from alkanolamines of the formula (I)

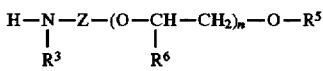

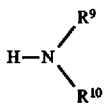

in which the radicals Z, $R^3$, $R^5$ and $R^6$ and n have the abovementioned meanings and $R^9$ and $R^{10}$ are identical or different and are hydrogen, $C_1$–$C_{22}$-alkyl, $C_2$–$C_{22}$-alkenyl or Z—OH, with the proviso that at least one radical $R^9$ or $R^{10}$ is Z—OH.

The following may be mentioned as examples of alkanolamines:
monoethanolamine, diethanolamine, N-methylethanolamine, 3-aminopropanol, isopropanol, diglycolamine, 2-amino-2-methylpropanol and mixtures thereof.

The radical X is derived from the reaction products of the dicarboxylic anhydride groups with alcohols of the formula HO—($C_1$–$C_{30}$)-alkyl and/or amines of the formula $ENR^3R^4$.

The following may be mentioned as examples of primary amines:
n-hexylamine, n-octylamine, n-tetradecylamine, n-hexadecylamine, n-stearylamine and N,N-dimethylaminopropylenediamine, cyclohexylamine, dehydroabietylamine and mixtures thereof.

The following may be mentioned as examples of secondary amines:
didecylamine, ditetradecylamine, distearylamine, dicoconut fatty amine, ditallow fatty amine and mixtures thereof.

The following may be mentioned as examples of alcohols:
methanol, ethanol, propanol, isopropanol, n-butanol, sec-butanol, tert-butanol, octanol, tetradecanol, hexa-decanol, octadecanol, tallow fatty alcohol, behenyl alcohol and mixtures thereof.

In the case of the monomers of the formula H, the index n indicates the degree of alkoxylation, i.e. the number of oxyalkyl groups which undergo addition per mol.

Alternating polymers of maleic anhydride (MA) and α,β-unsaturated olefins are known per se (Houben-Weyl, E20 (1987), page 1239 et seq.). The polymers can be prepared for example, as described in U.S. Pat. No. 4,526,950, by copolymerization of MA and olefins, if necessary in the presence of inert solvents, in the presence of free radical chain initiators.

The polyetheramines used are known. They can be prepared, for example, by reductive amination of polyglycols. Furthermore, polyetheramines having a primary amino group can be prepared by an addition reaction of polyglycols with acrylonitrile and subsequent catalytic hydrogenation. Moreover, polyetheramines are obtainable by reaction of polyethers with phosgene or thionyl chloride and subsequent amination to give the polyetheramine. The polyetheramines used according to the invention are commercially available (for example) under the name ®Jeffamine (Texaco). Their molecular weight is up to 2000 g/mol and the ethylene oxide/propylene oxide ratio is from 1:10 to 6:1.

The invention also relates to a process for the preparation of the reaction products according to the invention, wherein monomers of the general formulae E and/or F are first polymerized with a monomer of the general formula G and then reacted with a polyetheramine of the formula H and/or an amine of the formula I.

The polymerization is carried out by known, batchwise or continuous polymerization methods, such as mass, suspension, precipitation or solution polymerization, and initiation with suitable free radical chain initiators, for example hydroperoxides, peroxides or azo compounds, such as dilauroyl peroxide, dibenzoyl peroxide, tert-butyl perpivalate, tert-butyl permaleate, tert-butyl perbenzoate, dicumyl peroxide, tert-butyl cumyl peroxide, di-tert-butyl peroxide, cumyl hydroperoxide, tert-butyl hydroperoxide, 2,2'-azobis(2-methylpropanonitrile), 2,2'-azobis(2-methylbutyronitrile) and mixtures with one another. In general, these initiators are used in amounts of from 0.1 to 20% by weight, preferably from 0.2 to 10% by weight, based on the monomers.

The polymerization is carried out as a rule at temperatures of 40°–400° C., preferably 80°–250° C., pressure expediently being used when $\alpha,\beta$-unsaturated olefins or solvents having boiling points below the polymerization temperature are used. The polymerization is usually carried out in the absence of air, for example under nitrogen, since oxygen interferes with the polymerization. In choosing the initiator or the initiator system, it is expedient to ensure that the half-life of the initiator or of the initiator system at the chosen polymerization temperature is less than 3 hours.

In order to obtain low molecular weight polymers, it is often expedient to work in the presence of regulators known per se. Suitable regulators are, for example, organic mercapto compounds, such as 2-mercaptoethanol, 2-mercaptopropanol, mercaptoacetic acid, mercaptopropionic acid, tert-butyl mercaptan, n-butyl mercaptan, n-octyl mercaptan, n-dodecyl mercaptan and tert-dodecyl mercaptan, which are generally used in amounts of from 0.1% by weight to 10% by weight.

Apparatuses suitable for the polymerization are, for example, conventional stirred vessels having, for example, anchor stirrers, paddle stirrers, impeller stirrers or multistage impulse countercurrent agitators and, for the continuous preparation, stirred vessel cascades, tube reactors or static mixers.

Preferred process for the preparation of the polymers is solution polymerization. It is carried out in solvents in which the monomers and the resulting polymer are soluble. Suitable solvents for this purpose are all those which meet these requirements and which do not react with the monomers and with the resulting polymers. These are, for example, organic, preferably aromatic and/or aliphatic, solvents, such as cumene, toluene, xylene, ethylbenzene, decane, pentadecane or commercial solvent mixtures, such as ®Solvent Naphtha, ®Shellsol AB or ®Solvesso 150, ®Solvesso 200, ®Solvesso 250, ®EXXSOL, ®ISOPAR and ®Shellsol D types.

In the preparation, all monomers may be initially introduced and may be polymerized by adding a free radical chain initiator and with the supply of heat. Expediently, however, the solvent and some of the monomers (for example about 5–20% by weight) are initially taken and the remainder of the monomer mixture is metered in with the initiator and, if required, coinitiator and regulator.

In another preferred procedure, the solvent and the $\alpha,\beta$-unsaturated olefin of the formula G are also initially introduced into the polymerization reactor and, after the polymerization temperature has been reached, the anhydride-containing monomer of the formulae E and/or F, if necessary dissolved in solvent, and the initiator and, if required, coinitiator and regulator are metered in.

The concentration of the monomers to be polymerized is from 20 to 95% by weight, preferably from 50 to 90% by weight.

The copolymer obtained in the polymerization, described above, of $\alpha,\beta$-unsaturated dicarboxylic anhydride and $\alpha,\beta$-unsaturated olefin can be isolated by evaporating the solvent. However, a solvent in which the subsequent reaction with polyetheramine and/or alkanolamine can take place is preferably chosen for the polymerization. As a rule, it is advantageous to use the anhydrides of the dicarboxylic acids and not the free acids for the polymerization, since these react more readily with olefins and can then be reacted selectively with polyetheramines and/or alkanolamines. However, the use of the corresponding dicarboxylic acids cannot be excluded.

After polymerization, the reaction with polyetheramines of the general formula H and/or amaines of the formula I is carried out.

The preparation of the reaction products according to the invention by reaction of the polymers described above with polyetheramine of the formula H and/or amine of the formula I is carried out at temperatures of from 50° to 250° C., preferably from 60° to 200° C. While amides are preferably formed at temperatures below 100° C., imides are preferably formed from primary amines at higher temperatures.

The polyetheramine and/or amine is used in amounts of from about 0.01 to 2 mol per mol of polymerized dicarboxylic anhydride. The use of larger amounts is possible but has no advantage.

If 2 mol of a secondary amine of the formulae H and/or I are used, amidoammonium salts are obtained at low reaction temperatures (30°–120° C.). The formation of a second amido group requires temperatures above 120° C., longer residence times and removal of water. If amounts smaller than 1 mol of the secondary amine are used, complete conversion to the monoamide does not take place.

Hence, hemiamides, imides and/or diamides are formed, depending on the reaction conditions. If less than an equimolar amount, based on the dicarboxylic anhydride groups, of polyetheramine is added, remaining acid groups may be esterified by reaction with alcohols or amidated by reaction with primary or secondary amines of the formula (I). In the case of the formation of hemiamies, the remaining acid group may be esterified with a fatty alcohol or neutralized with an amine.

Preferably, the polymer containing structural units derived from an $\alpha,\beta$-unsaturated dicarboxamide and an $\alpha,\beta$-unsaturated olefin, if necessary dissolved in an inert solvent, is initially introduced and the polyetheramine is metered in. However, it is also possible for all starting materials to be mixed at room temperature and caused to react by increasing the temperature. Suitable solvents are organic, preferably aromatic, solvents, such as toluene, xylene and high-boiling solvent mixtures, such as ®Shellsol AB.

A further possibility for the preparation of the reaction products according to the invention is to use an alkanolamine of the formula I instead of the polyetheramines in the preparation process described above and to subject it to subsequent oxyalkylation.

From 0.01 to 2 mol, preferably from 0.01 to 1 mol, of alkanolamine are used per mol of anhydride. The reaction temperature is from 50° to 100° C. (amide formation). In the case of primary amines, the reaction is carried out at temperatures above 100° C. (imide formation).

The oxyalkylation is usually carried out at temperatures of from 70° to 170° C. with catalysis by bases, such as NaOH or NaOCH$_3$, by supplying gaseous alkylene oxide, such as ethylene oxide (EO) and/or propylene oxide (PO). Usually from 1 to 500, preferably from 1 to 100, mol of alkylene oxide are added per mol of hydroxyl group.

In a further variant, it is possible to prepare the reaction products according to the invention by reaction of the monomers of the formulae E and/or F with polyetheramine of the formula H and subsequent polymerization with monomers of the formula G. For this purpose, the monomers of the formulae E and/or F are initially introduced together with the polyetheramine of the formula H in a suitable solvent and heated to a temperature below 100° C. The hemiamide is then polymerized as described above. Polymerization is preferably effected in solution.

It has been found that the reaction products according to the invention, as mixtures with ethylene/vinyl ester copolymers, have an excellent action as paraffin dispersants in paraffin-containing middle distillates and lead to a further reduction of the CFPP (Cold Filter Plugging Point). The paraffins contained in the middle distillates may be straight-chain or branched alkanes having about 10–50 carbon atoms. Usually, these mixtures comprise from 10 to 1000 ppm, preferably from 50 to 500 ppm, of the reaction products according to the invention and from 1 to 10,000 ppm, preferably from 50 to 1000 ppm, of ethylene/vinyl ester copolymers. In addition to these ethylene/vinyl ester copolymers, copolymers which have further suitable structural units are also suitable. The copolymers according to the invention and ethylene/vinyl ester copolymers may also be added as individual substances to the middle distillates which already contain one of these components.

Suitable vinyl ester monomers are $C_1$–$C_{20}$-alkyl vinyl esters, preferably $C_1$–$C_{12}$-alkyl vinyl esters, e.g. vinyl acetate, vinyl propionate, vinyl neononanoate and vinyl neodecanoate, and vinyl esters of saturated $C_{10}$–$C_{24}$-fatty acids. Further suitable ethylene monomers are esters of unsaturated carboxylic acids, preferably the $C_1$–$C_{24}$-alkyl esters of acrylic acid, methacrylic acid and fumaric acid, and diisobutylene.

Such ethylene/vinyl ester copolymers (or tarpolymers) are described in detail in the patent literature. For example, DE-B-11 47 799 (ethylene/vinyl acetate), DE-A-32 47 753 (ethylene/alkenecarboxylates, vinyl carboxylares/vinyl ketones), U.S. Pat. No. 4,015,063 (ethylene, dimethylvinylcarbinol, fatty acid vinyl esters), EP-A-203 554 (ethylene/diisobutylene/vinyl acetate), EP-A-309 897 (ethylene/vinyl methoxyacetate) and DE-A-40 42 206 (ethylene/vinyl acetate/vinyl neononanoate or neodecanoate) may be mentioned.

Preferred ethylene/vinyl ester copolymers are those which contain essentially 80–51% by weight of ethylene and 20–49% by weight of vinyl acetate or vinyl propionate.

Preferred ethylene/vinyl ester terpolymers contain, in addition to 79–40% by weight of ethylene, 20–35% by weight, preferably 1–15% by weight of vinyl acetate or vinyl propionate and 1–25% by weight, preferably 1–15% by weight of diisobutylene, vinyl neononanoate or vinyl neodecanoate.

Furthermore, it has been found that mixtures of the reaction products according to the invention, the ethylene/vinyl ester copolymers described above and certain quaternary ammonium salts have an excellent action as paraffin dispersants in middle distillates.

Suitable quaternary ammonium salts have the general formula

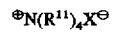

$${}^{\oplus}N(R^{11})_4 X^{\ominus}$$

in which the radicals $R^{11}$ are identical or different and are $C_1$–$C_{30}$-alkyl, preferably $C_1$–$C_{22}$-alkyl, $C_1$–$C_{30}$-alkenyl, preferably $C_1$–$C_{22}$-alkenyl, benzyl or a radical of the formula —$(CH_2$—$CH_2$—$O)_n$—$R^{12}$, in which $R^{12}$ is hydrogen or a fatty acid radical of the formula $C(O)$—$R^{13}$, in which $R^{13}$ is $C_6$–$C_{40}$-alkyl or $C_6$–$C_{40}$-alkenyl, n is a number from 1 to 30 and X is halogen, preferably chlorine, or methosulfate.

The following may be mentioned as examples of such quaternary ammonium salts: dihexadecyldimethylammonium chloride, distearyldimethylammoniumchloride, quaternization products of esters of di- and triethanolamine with long-chain fatty acids (lauric acid, myristic acid, palmitic acid, stearic acid, behenic acid, oleic acid and fatty acid mixtures, such as coconut fatty acid, tallow fatty acid, hydrogenated tallow fatty acid, tall oil fatty acid), such as N-methyltriethanolammonium distearyl ester chloride, N-methyltriethanolammonium distearyl ester methosulfate, N,N-dimethyldiethanolammonium distearyl ester chloride, N-methyltriethanolammonium dioleyl ester chloride, N-methyltriethanolammonium trilauryl ester methosulfate, N-methyltriethanolammonium tristearyl ester methosulfate and mixtures thereof.

The mixtures of the reaction products according to the invention, ethylene/vinyl ester copolymers and quaternary ammonium salts usually comprise from 10 to 1000 ppm, preferably from 50 to 500 ppm, of the reaction products according to the invention, from 10 to 10,000 ppm, preferably from 50 to 1000 ppm, of ethylene/vinyl ester copolymers and from 10 to 1000 ppm, preferably from 50 to 500 ppm, of the quaternary ammonium salts.

The reaction products according to the invention and the mixtures described above improve the low-temperature behavior of these oils and thus result in improved flow behavior compared with the prior art. In particular, the CFPP and the paraffin dispersing are improved.

The cold flow behavior is measured by the CFPP test according to EN 116 (European Standard).

The paraffin dispersing in middle distillates can be detected by storage of the additive-containing oil samples in a refrigerator at temperatures of from −13° to −20° C. (procedure according to M. Feustel et al., Erdöl, Kohle, Erdgas & Petrochemie [Mineral oil, coal, natural gas and petroleum chemistry], Vol. 43, page 396, FIG. 2 (1990)) with subsequent visual assessment of the sedimentation behavior and separation of the oil sample into an upper and lower phase according to the CFPP value (EN 116).

EXAMPLES

The polyetheramines used are commercial products from Texaco (®Jeffamine) of the general formula $CH_3O$—$[CH_2CH(R)O]_n$—$CH_2CH(CH_3)$—$NH_2$ having the following specifications: (if R is H, the square bracket means EO; if R is $CH_3$, the square bracket means PO)

| Polyetheramine | EO/PO | MW |
| --- | --- | --- |
| ®Jeffamine M-600 | 1:9 | 600 |
| ®Jeffamine M-715 | 13:2 | 715 |
| ®Jeffamine M-1000 | 19:3 | 1000 |
| ®Jeffamine M-2005 | 3:32 | 2000 |
| ®Jeffamine M-2070 | 32:10 | 2000 |

®Shellsol AB and ®Solvent Naphtha are commercial solvents (mixture of aromatics having a boiling range of 185°–210° C.) from Shell or Veba Oel.

The reactions are carried out in 4-necked round-bottomed flasks equipped with a stirrer, a reflux condenser, an internal thermometer, an electric heating bath and, if required, a gas inlet tube.

The K values were determined according to Ubbelohde by means of a 1% strength by weight solution in toluene at 25° C.

The solids contents were determined by drying, at 120° C. under reduced pressure (200 mbar) for 16 hours, the solutions obtained from the reactions.

Example 1

Reaction product of a $C_{14/16}$-α-olefin/maleic anhydride copolymer containing 5 mol % (based on amount of maleic anhydride) of ®Jeffamine M-1000 and 0.9 mol equivalent of dicoconut fatty amine 83.6 g of a 29.4% strength by weight maleic anhydride/$C_{14/16}$-α-olefin copolymer solution in ®Shellsol AB (containing 132 mmol of anhydride groups) is stirred with 6.6 g (6.6 mmol) of ®Jeffamine M-1000 for two hours at 140° C. After cooling to 90° C., 46.8 g (120 mmol) of dicoconut fatty amine are added and stirring is continued for 3 hours at this temperature.

The resulting, yellow solution has a solids content of 49%, and the brittle, slightly yellow-coloured, waxy reaction product obtained after drying has a titratable basic nitrogen content of 0.78%. The K value is 17.

Example 2

Reaction product of a $C_{14/16}$-α-olefin/maleic anhydride copolymer containing 5 mol %, based on amount of maleic anhydride, of ®Jeffamine M-715 and 1.9 mol equivalents of dicoconut fatty amine 141 g of a 22% strength solution of a maleic anhydride/$C_{14/16}$-α-olefin copolymer (containing 95 mmol of anhydride groups) in ®Solvent Naphtha and 3.4 g (5 mmol) of ®Jeffamine M-715 are stirred for two hours at 140° C. and, after the addition of 69 g (180 mmol) of dicoconut fatty amine, for a further 2 hours at 90° C.

The resulting solution has a solids content of 48%, and the brittle, waxy reaction product obtained after drying has a titratable basic nitrogen content of 0.72%.

Example 3

Reaction product of $C_{14/16}$-α-olefin/maleic anhydride copolymer containing 5 mol %, based on amount of maleic anhydride, ®Jeffamine M-600 and 1.9 mol equivalents of a mixture of dicoconut fatty amine and ditallow fatty amine (1:1)

A solution of 31 g of a maleic anhydride/$C_{14/16}$-α-olefin copolymer (containing 95 mmol of anhydride groups) in 110 g of ®Solvent Naphtha and 3 g (5 mmol) of ®Jeffamine M-600 are stirred for two hours at 140° C. and, after the addition of a mixture of 33 g (90 mmol) of dicoconut fatty amine and 43 g (90 mmol) of ditallow fatty amine, for a further 2 hours at 90° C.

The resulting solution has a solids content of 49% and an acid number of 22 mg KOH/g. The brittle, waxy reaction product obtained after drying has a titratable basic nitrogen content of 0.58%.

Example 4

Reaction of a maleic anhydride/$C_{14/16}$-α-olefin copolymer with a mixture of ®Jeffamine M-1000 and ditallow fatty amine A solution of 22 g of maleic anhydride/$C_{14/16}$-α-olefin copolymer (containing 70 mmol of anhydride groups) in 100 g of ®Solvent Naphtha is stirred with a mixture of 14 g (15 mmol) of ®Jeffamine M-1000 and 63 g (126 mmol) of ditallow fatty amine for four hours at 90° C.

The resulting solution has a solids content of 50% and an acid number of 20 mg KOH/g. The brittle, waxy reaction product obtained after drying has a titratable basic nitrogen content of 0.58%.

Example 5

Reaction of a maleic anhydride/$C_{20/22}$-α-olefin copolymer with one equivalent of ®Jeffamine M-1000 and one equivalent of ditallow fatty amine A solution of 24 g of a maleic anhydride/$C_{20/22}$-α-olefin copolymer (containing 50 mmol of anhydride groups) in 100 g of ®Solvent Naphtha and 50 g (50 mmol) of ®Jeffamine M-1000 are stirred for three hours at 90° C. and then neutralized with 25 g (50 mmol) of ditallow fatty amine.

The resulting solution has a solids content of 52% and an acid number of 13 mg KOH/g. The brittle, waxy reaction product obtained after drying has a titratable basic nitrogen content of 0.37%.

Example 6

Reaction of a maleic anhydride/$C_{18}$-α-olefin copolymer with ®Jeffamine M-715 and behenyl alcohol.

A solution of 48 g of maleic anhydride/$C_{18}$-α-olefin copolymer (containing 0.13 mol of anhydride groups) in 96 g of ®Solvent Naphtha is stirred with 9.3 g (13 mmol) of ®Jeffamine M-715 and 32 g (1000 mmol) of behenyl alcohol (®Stenol A, Henkel) for three hours at 120° C.

The resulting orange-colored solution has a solids content of 53% and an acid number of 34 mg KOH/g. The brittle, waxy reaction product obtained after drying contains no titratable basic nitrogen. An IR band at 1730 cm$^{-1}$ shows the presence of ester groups; bands at 1700 cm$^{-1}$ (shoulder) and 1770 cm$^{-1}$ indicate the presence of imido groups.

Example 7

Neutralization of the polymer solution according to Example 4 with ditallow fatty amine A 50% strength by weight solution of 40 g (0.08 mol) of ditallow fatty amine in ®Solvent Naphtha is added to 117 g of the polymer solution according to Example 4 and the mixture is stirred for 1 hour at 60° C.

Example 8

Reaction of a maleic anhydride/vinyl neodecanoate copolymer with ®Jeffamine M-715 and ditallow fatty amine 123 g (containing 76 mmol of anhydride groups) of a 19% strength by weight solution of a maleic anhydride/vinyl decanoate copolymer in ®Solvent Naphtha are stirred with a mixture of 5.5 g (7.7 mmol) of ®Jeffamine M-715 and 72 g (145 mmol) of ditallow fatty amine for 3 hours at 90° C.

The resulting reddish, low-viscosity polymer solution has a solids content of 46% by weight. The brittle, reddish, waxy reaction product obtained after drying has a titratable basic nitrogen content of 0.69%.

Example 9

Reaction of a maleic anhydride/styrene copolymer with ®Jeffamine M-1000 and ditallow fatty amine 30 g (30 mmol) of ®Jeffamine M-1000 and 134 g (270 mmol) of ditallow fatty amine are added to a suspension of 30 g (containing 150 mmol of anhydride groups) of a maleic anhydride/styrene copolymer in 194 g of ®Solvent Naphtha and the mixture is stirred for 3 hours at 160° C. As the reaction progresses, the suspension becomes a clear solution.

The resulting low-viscosity polymer solution has a solids content of 51% by weight. The brittle, waxy reaction product obtained after drying has a titratable basic nitrogen content of 0.67%. The acid number is 11 mg KOH/g.

Example 10

Preparation of a maleic acid hemiamide with ®Jeffamine M-600

29.4 g (0.3 mol) of maleic anhydride and 180 g (0.3 mol) of ®Jeffamine M-600 (9 PO, 1 EO; MW about 600 g/mol) in 209 g of toluene are refluxed for 4 hours. After the solvent has been stripped off under reduced pressure, a yellow oil results. The product has a basic nitrogen content of 0.23% and an acid number of 67.4 mg KOH/g (hemiamide).

Example 11

Preparation of an imide from maleic anhydride and ®Jeffamine M-715

27 g (0.275 mol) of maleic anhydride and 179 g (0.25 mol) of ®Jeffamine M-715 are stirred for 6 hours at 180° C. with the addition of 0.4 g of hypophosphorous acid and while passing through a gentle stream of nitrogen. The resulting product has a acid number of 26 mg KOH/g; IR bands at 1700 and 1770 cm$^{-1}$ indicate the formation of a carboximide.

Example 12

Preparation of a copolymer of a $C_{14/16}$-α-olefin and maleic acid hemiamide according to Example 10 a) An initiator solution comprising 2 g of di-tert-butyl peroxide in 8 g of ®Solvent Naphtha and b) 110 g (0.2 mol) of maleic acid polyether monoamide according to Example 10 are metered simultaneously and continuously over a period of 2 hours into a solution of 27 g (0.14 mol) of tetradecene and 31 g (0.14 mol) of hexadecene in 159 g of ®Solvent Naphtha while passing through nitrogen at 160° C. from two metering funnels. Stirring is continued for one hour at 160° C.

The resulting polymer solution has a solids content of 44% by weight. It contains no basic nitrogen; IR bands at 1700 and 1770 cm$^{-1}$ indicate the presence of imido groups. The K value of the polymer (1% strength in toluene; according to Ubbelohde) is 14.

Example 13

Terpolymer of $C_{18}$-α-olefin, $C_{18}$-maleimide and maleic acid polyetherimide according to Example 11

A mixture of 17 g (0.02 mol) of the polyetherimide according to Example 11, 70 g (0.19 mol) of N-octadecylmaleimide and 74 g (0.29 mol) of 1-octadecene is heated to 160° C. while passing through nitrogen. At this temperature, an initiator solution comprising 1.8 g of di-tert-butyl peroxide in 44 g of ®Solvent Naphtha is added. After the exothermic reaction has ceased, stirring is continued for one hour at 160° C.

The resulting solution has a solids content of 58%. The brittle, waxy reaction product obtained after drying has a K value of 16.

Example 14

Reaction of a copolymer of a $C_{20/22}$-α-olefin and maleic anhydride with monoethanolamine and subsequent oxyethylation 1st stage:

363 g of a solution of 218 g of a maleic anhydride $C_{20/22}$-copolymer (containing 0.45 mol of anhydride groups) in 145 g of ®Solvent Naphtha are added to a solution of 27.4 g (0.45 mol) of ethanolamine in 109.5 g of ®Solvent Naphtha at 90° C. in the course of one hour. Thereafter, the mixture is heated to 160° C. and resulting water of reaction is distilled off while passing through a gentle stream of nitrogen in the course of 1.5 hours.

The acid number of the resulting 54% strength by weight polymer solution is 3 mg KOH/g; no titratable basic nitrogen is present. The IR spectrum shows an intensive band at 1690 cm$^{-1}$, which is characteristic of imides.

2nd stage:

0.58 g of sodium methylate is added to 213 g of the above polymer solution (containing 0.2 mol of hydroxyl groups) at 60° C. in an autoclave provided with a stirrer. The resulting methanol is distilled off in the course of one hour under reduced pressure.

44 g (1 mol) of ethylene oxide is then metered in over 30 minutes at from 95° to 110° C. and at a pressure of not more than 3.6 bar. Stirring is continued for one hour at 100° C. and, after cooling to 60° C., residual ethylene oxide is stripped off under reduced pressure.

A 61% strength, reddish brown polymer solution having a K value of 15 results. The reaction product is isolated as described above.

Use Examples:

|  | Middle distillate 1 | Middle distillate 2 | Middle distillate 3 |
| --- | --- | --- | --- |
| Cloud point CP (°C.) | −8 | −8 | −8 |
| CFPP (°C.) | −10 | −8 | −12 |
| Density/20° C./(g/ml) | 0.837 | 0.822 | 0.853 |
| Initial boiling point (°C.) | 183 | 173 | 168 |
| 20% boiling point (°C.) | 225 | 221 | 216 |
| 90% boiling point (°C.) | 338 | 333 | 315 |
| Final boiling point (°C.) | 361 | 358 | 345 |

Key: Flow improvers

FI(A)=Ethylene/vinyl acetate/vinyl versatate copolymer (containing about 31% of vinyl acetate), melt viscosity ($V_{140}$) about 110 mPa.s FI(B)=Ethylene/vinyl acetate copolymer (containing about 32% of vinyl acetate), average molecular weight about 1500

QAS: N-Methyltriethanolammonium distearyl ester methosulfate

Key: Dispersant
PD1=Example 2
PD2=Example 1
PD3=Example 4
PD4=Example 3
PD5=Example 1
PD6=Example 7
PD7=Example 8
PD8=Example 9
PD9=Example 12

TABLE 1

Middle distillate I

| FI | Conc. (ppm) | PD | Conc. (ppm) | QAS (ppm) | Paraffin sediment (% by volume) | Paraffin in oil phase | Dispersing | Lower phase CP °C. | Lower phase CFPP °C. | Upper phase CP °C. | Upper phase CFPP °C. |
|---|---|---|---|---|---|---|---|---|---|---|---|
| — | — | — | — | — | 35 | K | S | −3 | −9 | −13 | −11 |
| FI(A) | 350 | — | — | — | 21 | K | S | −5 | −10 | −12 | −13 |
| FI(A) | 500 | — | — | — | 27 | K | S | −4 | −17 | −13 | −12 |
| FI(A) | 350 | PD1 | 100 | — | 10 | T-K | S-D | −6 | −21 | −11 | −19 |
| FI(A) | 350 | PD1 | 100 | 50 | 2 | T | D | −9 | −28 | −10 | −28 |
| FI(A) | 350 | PD3 | 100 | — | 14 | T-K | S | −5 | −18 | −11 | −19 |
| FI(A) | 350 | PD3 | 100 | 50 | 5 | T | D | −8 | −26 | −9 | −25 |
| FI(A) | 350 | PD4 | 100 | — | 8 | T-K | S-D | −7 | −21 | −11 | −22 |
| FI(A) | 350 | PD4 | 100 | 50 | 3 | T | D | −8 | −27 | −10 | −27 |
| FI(A) | 350 | PD7 | 100 | — | 7 | T | D | −7 | −23 | −9 | −21 |
| FI(A) | 350 | PD7 | 100 | 50 | 3 | T | D | −9 | −28 | −9 | −29 |

TABLE 2

Middle distillate II

| FI | Conc. (ppm) | PD | Conc. (ppm) | QAS (ppm) | Paraffin sediment (% by volume) | Paraffin in oil phase | Dispersing | Lower phase CP °C. | Lower phase CFPP °C. | Upper phase CP °C. | Upper phase CFPP °C. |
|---|---|---|---|---|---|---|---|---|---|---|---|
| — | — | — | — | — | 45 | K | S | −3 | −6 | −12 | −14 |
| FI(A) | 300 | — | — | — | 40 | K | S | −7 | −14 | −13 | −15 |
| FI(A) | 300 | PD2 | 100 | — | 11 | K | S | −7 | −24 | −11 | −19 |
| FI(A) | 300 | PD2 | 100 | 50 | 5 | T | D | −7 | −26 | −9 | −25 |
| FI(A) | 300 | PD2 | 200 | 100 | 2 | T | D | −8 | −29 | −9 | −28 |
| FI(A) | 300 | PD3 | 100 | 50 | 3 | T | D | −8 | −27 | −9 | −28 |
| FI(A) | 300 | PD3 | 200 | 100 | 4 | T | D | −8 | −28 | −10 | −28 |
| FI(A) | 300 | PD5 | 100 | — | 9 | LT | S-D | −6 | −25 | −10 | −20 |
| FI(A) | 300 | PD5 | 100 | 50 | 3 | T | D | −7 | −28 | −9 | −26 |
| FI(A) | 300 | PD5 | 200 | 100 | 0 | T | D | −8 | −28 | −8 | −28 |
| FI(A) | 300 | PD8 | 100 | — | 10 | T-K | S | −5 | −23 | −11 | −23 |
| FI(A) | 300 | PD8 | 100 | 50 | 6 | T-K | D | −6 | −26 | −10 | −25 |
| FI(A) | 300 | PD8 | 100 | — | 4 | T | D | −8 | −29 | −10 | −29 |
| FI(A) | 300 | PD9 | 100 | — | 7 | T | D | −7 | −21 | −8 | −20 |
| FI(A) | 300 | PD9 | 100 | 50 | 6 | T | D | −7 | −25 | −8 | −24 |
| FI(A) | 300 | PD9 | 200 | 100 | 1 | T | D | −8 | −30 | −9 | −28 |

TABLE 3

Middle distillate III

| FI | Conc. (ppm) | PD | Conc. (ppm) | QAS (ppm) | Paraffin sediment (% by volume) | Paraffin in oil phase | Dispersing | Lower phase CP °C. | Lower phase CFPP °C. | Upper phase CP °C. | Upper phase CFPP °C. |
|---|---|---|---|---|---|---|---|---|---|---|---|
| — | — | — | — | — | 40 | K | S | −4 | −14 | −13 | −18 |
| FI(B) | 100 | — | — | — | 18 | K | S | −5 | −15 | −13 | −10 |
| FI(B) | 250 | — | — | — | 20 | K | S | −6 | −21 | −14 | −16 |
| FI(B) | 100 | PD4 | 100 | — | 12 | LT | S | −5 | −23 | −13 | −21 |
| FI(B) | 100 | PD4 | 80 | 40 | 5 | LT | D | −7 | −25 | −10 | −23 |
| FI(B) | 100 | PD4 | 100 | 50 | 1 | T | D | −8 | −27 | −9 | −26 |
| FI(B) | 100 | PD5 | 100 | — | 13 | T-K | S | −5 | −23 | −12 | −20 |
| FI(B) | 100 | PD5 | 100 | 50 | 6 | T | D | −7 | −28 | −11 | −24 |
| FI(B) | 100 | PD6 | 100 | — | 11 | T-K | S | −6 | −22 | −11 | −21 |
| FI(B) | 100 | PD6 | 100 | 50 | 3 | T | D | −8 | −26 | −10 | −25 |
| FI(B) | 100 | PD7 | 100 | — | 7 | LT | D | −7 | −24 | −91 | −21 |
| FI(B) | 100 | PD7 | 100 | 50 | 0 | T | D | −9 | −27 | −90 | −26 |

TABLE 3-continued

Middle distillate III

| FI | Conc. (ppm) | PD | Conc. (ppm) | QAS (ppm) | Paraffin sediment (% by volume) | Paraffin in oil phase | Dispersing | Lower phase CP °C. | Lower phase CFPP °C. | Upper phase CP °C. | Upper phase CFPP °C. |
|---|---|---|---|---|---|---|---|---|---|---|---|
| FI(B) | 100 | PD8 | 100 | — | 8 | LT | S | −6 | −23 | −10 | −22 |
| FI(B) | 100 | PD8 | 100 | 50 | 2 | T | D | −8 | −25 | −9 | −25 |

The meanings are as follows:
K=clear
T=cloudy
LT=slightly cloudy
S=sediment
D=dispersed

We claim:

1. A reaction product of a polyetheramine with a polymer comprising dicarboxylic acid anhydride groups, which contains 20–80 mol % of bivalent structural units A or C or a mixture of A and C and, optionally, structural units B

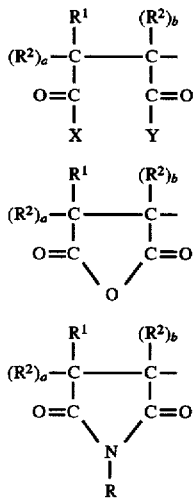

in which
$R^1$ and $R^2$, independently of one another, are hydrogen or methyl,
a and b are equal to zero or one and a+b is equal to one,
Y is X or $NRR^3$
X is —OH, —O—($C_1$–$C_{30}$-alkyl), $NR^3R^4$ or —O$^\ominus$N$^\oplus$R$^3$R$^4$,
$R^3$ and $R^4$, independently of one another, are hydrogen, $C_6$–$C_{40}$-alkyl or R,
R is

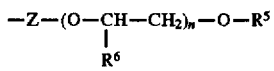

with the proviso that at at least 1 mol % of the anhydride groups bonded to the polymer have react with a polyetheramine of the formula (H)

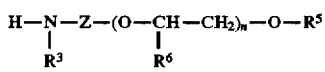

in which $R^3$ is hydrogen, $C_6$–$C_{40}$-alkyl or R,
R is a group of the formula

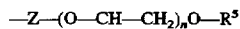

Z is $C_2$–$C_4$-alkyl,
n is a number from 1 to 1000,
$R^5$ is $C_1$–$C_{30}$-alkyl, $C_5$–$C_{12}$-cycloalkyl or $C_8$–$C_{30}$-aryl and
$R^6$ is hydrogen or $C_1$–$C_4$-alkyl,
Z is $C_2$–$C_4$-alkyl,
n is a number from 1 to 1000,
$R^5$ is $C_1$–$C_{30}$-alkyl, $C_5$–$C_{12}$-cycloalkyl or $C_6$–$C_{30}$-aryl and
$R^6$ is hydrogen or $C_1$–$C_4$-alkyl, and
80–20 mol % of bivalent structural units D

in which
$R^7$ is hydrogen or $C_1$–$C_4$-alkyl and
$R^8$ is $C_1$–$C_{60}$-alkyl or $C_6$–$C_{18}$-aryl.

2. A process for the preparation of the reaction products as claimed in claim 1, which comprises polymerizing monomers of the formulae E or F or a mixture of formulae E or F with the monomers of the formula G,

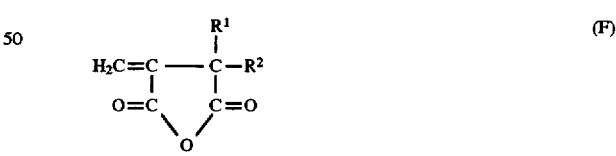

in which
$R^1$ and $R^2$, independently of one another, are hydrogen or methyl,

in which $R^7$ is hydrogen or $C_1$–$C_4$-alkyl and $R^8$ is $C_1$–$C_{60}$-alkyl or $C_6$–$C_{18}$-aryl, and then reacting the product formed with polyetheramines of the formula H or a mixture of formula H with an alkanolamine of the formula I,

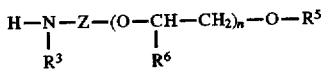 (H)

in which

R$^3$ is hydrogen, C$_6$–C$_{40}$-alkyl or R, R is a group of the formula

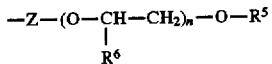

Z is C$_2$–C$_4$-alkyl,
n is a number from 1 to 1000,
R$^5$ is C$_1$–C$_{30}$-alkyl, C$_5$–C$_{12}$-cycloalkyl or C$_8$–C$_{30}$-aryl and
R$^6$ is hydrogen or C$_1$–C$_4$-alkyl,

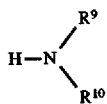 (I)

in which R$^9$ and R$^{10}$, independently of one another, are hydrogen, C$_2$–C$_{22}$-alkenyl, C$_1$–C$_{22}$-alkyl or Z—OH, with the proviso that at least one radical R$^9$ or R$^{10}$ is Z—OH and with the proviso that at least 1 mol % of the anhydride groups bonded to the polymer are reacted with a polyetheramine.

3. The process as claimed in claim 2, wherein the reaction of the polymer with the polyetheramines of the formula (H) or with the alkanolamines of the formula (I) or a mixture of formulae (H) and (I) is carried out at temperatures of from 50° to 250° C.

4. The process as claimed in claim 2, wherein the polymerization is carried out in a solvent in which the monomers of the formulae E, F, G, H or I or a mixture thereof, and the reaction products as claimed in claim 1 are soluble.

5. The reaction product as claimed in claim 1, wherein said dicarboxylic anhydride groups contain 40 to 60 mol % of bivalent structural units A or C or a mixture of A and C, and optionally, structural units B and 60 to 40 mol % of bivalent structural units D.

6. The reaction product as claimed in claim 5, wherein R$^6$ is methyl.

* * * * *